(12) United States Patent
Bayerl et al.

(10) Patent No.: US 7,409,435 B1
(45) Date of Patent: Aug. 5, 2008

(54) INTEGRATED SERVICES HUB BINARY FILE TRIAL RUN PROCESS

(75) Inventors: Thomas Bayerl, Williamston, MI (US); Steven R. Lilly, East Lansing, MI (US)

(73) Assignee: Sprint Communications Company L.P., Overland Park, KS (US)

( * ) Notice: Subject to any disclaimer, the term of this patent is extended or adjusted under 35 U.S.C. 154(b) by 847 days.

(21) Appl. No.: 10/086,101

(22) Filed: Feb. 28, 2002

(51) Int. Cl.
   *G06F 15/16* (2006.01)
(52) U.S. Cl. ............... 709/217; 713/1; 713/2; 713/100; 709/222; 709/220; 709/221; 717/124; 717/126; 717/168; 717/171; 717/174; 717/176
(58) Field of Classification Search ......... 709/221; 717/171, 173
   See application file for complete search history.

(56) References Cited

U.S. PATENT DOCUMENTS

| | | | | |
|---|---|---|---|---|
| 5,128,995 A | * | 7/1992 | Arnold et al. ............ | 713/1 |
| 5,268,928 A | * | 12/1993 | Herh et al. ............ | 375/222 |
| 5,388,267 A | * | 2/1995 | Chan et al. ............ | 713/2 |
| 5,452,339 A | * | 9/1995 | Siu et al. ............ | 379/27.01 |
| 5,701,492 A | * | 12/1997 | Wadsworth et al. ...... | 701/173 |
| 5,717,887 A | * | 2/1998 | Leslie ............ | 717/173 |
| 5,781,921 A | * | 7/1998 | Nichols ............ | 711/115 |
| 5,787,288 A | * | 7/1998 | Nagata et al. ............ | 717/173 |
| 5,819,087 A | * | 10/1998 | Le et al. ............ | 713/2 |
| 5,872,967 A | * | 2/1999 | DeRoo et al. ............ | 713/2 |
| 5,878,256 A | * | 3/1999 | Bealkowski et al. ...... | 713/2 |
| 5,881,142 A | | 3/1999 | Frankel et al. ............ | 379/167 |
| 5,922,072 A | * | 7/1999 | Hutchinson et al. ...... | 713/2 |
| 5,935,242 A | * | 8/1999 | Madany et al. ............ | 713/1 |
| 5,963,620 A | | 10/1999 | Frankel et al. ............ | 379/93.05 |
| 5,987,625 A | * | 11/1999 | Wolff ............ | 714/36 |
| 6,055,632 A | * | 4/2000 | Deegan et al. ............ | 713/100 |
| 6,075,784 A | | 6/2000 | Frankel et al. ............ | 370/356 |
| 6,141,339 A | | 10/2000 | Kaplan et al. ............ | 370/352 |
| 6,154,838 A | * | 11/2000 | Le et al. ............ | 713/2 |
| 6,223,284 B1 | * | 4/2001 | Novoa et al. ............ | 713/100 |
| 6,237,091 B1 | * | 5/2001 | Firooz et al. ............ | 713/1 |
| 6,275,931 B1 | * | 8/2001 | Narayanaswamy et al. | 713/2 |
| 6,314,532 B1 | * | 11/2001 | Daudelin et al. ............ | 714/38 |
| 6,324,692 B1 | * | 11/2001 | Fiske ............ | 717/171 |
| 6,584,559 B1 | * | 6/2003 | Huh et al. ............ | 713/2 |
| 6,594,723 B1 | * | 7/2003 | Chapman et al. ............ | 711/103 |
| 6,598,057 B1 | * | 7/2003 | Synnestvedt et al. ...... | 707/200 |

(Continued)

OTHER PUBLICATIONS

U.S. Appl. No. 09/197,044, filed Nov. 20, 1998, Way et al.

(Continued)

*Primary Examiner*—Bunjob Jaroenchonwanit
*Assistant Examiner*—Dohm Chankong

(57) ABSTRACT

The present invention discloses a method of automatically downloading and testing binary code for a customer premises telecommunications hub. When a new binary file is received by the hub, it is loaded into flash memory, but is not locked or designated as the currently active binary file. A trial run message is then written into SDRAM identifying the new file. The system if rebooted and starts up with the new file. A verification process is run to determine if the new file functions properly. If it does, the trial run message is deleted and the new file is locked into flash memory as the current binary. If the trial fails, the trial run message is deleted and the system is rebooted with the previous binary file.

14 Claims, 4 Drawing Sheets

U.S. PATENT DOCUMENTS

| | | | |
|---|---|---|---|
| 6,615,404 B1 * | 9/2003 | Garfunkel et al. | 717/173 |
| 6,640,334 B1 * | 10/2003 | Rasmussen | 717/171 |
| 6,732,267 B1 * | 5/2004 | Wu et al. | 713/2 |
| 6,834,384 B2 * | 12/2004 | Fiorella et al. | 717/169 |
| 6,854,054 B1 * | 2/2005 | Kavanagh | 713/2 |
| 6,895,463 B2 * | 5/2005 | Oga et al. | 711/103 |
| 6,904,457 B2 * | 6/2005 | Goodman | 709/221 |
| 6,928,579 B2 * | 8/2005 | Aija et al. | 714/6 |
| 6,944,854 B2 * | 9/2005 | Kehne et al. | 717/168 |
| 6,965,989 B1 * | 11/2005 | Strange et al. | 713/1 |
| 6,993,648 B2 * | 1/2006 | Goodman et al. | 713/2 |
| 7,055,148 B2 * | 5/2006 | Marsh et al. | 717/172 |
| 2002/0087668 A1 * | 7/2002 | San Martin et al. | 709/221 |
| 2002/0144187 A1 * | 10/2002 | Morgan et al. | 714/43 |
| 2003/0061604 A1 * | 3/2003 | Elcock et al. | 717/170 |
| 2003/0182414 A1 * | 9/2003 | O'Neil | 709/223 |
| 2004/0015941 A1 * | 1/2004 | Sekine | 717/168 |

OTHER PUBLICATIONS

U.S. Appl. No. 09/226,575, filed Jan. 7, 1999, Rush et al.
U.S. Appl. No. 09/650,985, filed Aug. 30, 2000, Kaplan et al.
U.S. Appl. No. 09/650,560, filed Aug. 30, 2000, Kaplan et al.
U.S. Appl. No. 09/653,105, filed Aug. 31, 2000, Dale et al.
U.S. Appl. No. 09/675,585, filed Sep. 29, 2000, Goodrich.
U.S. Appl. No. 09/687,683, filed Oct. 12, 2000, Bayerl et al.
U.S. Appl. No. 09/689,365, filed Oct. 12, 2000, Goodrich.
U.S. Appl. No. 09/702,933, filed Oct. 31, 2000, Mahaney.
U.S. Appl. No. 09/711,113, filed Nov. 9, 2000, Goodrich et al.
U.S. Appl. No. 09/727,201, filed Nov. 30, 2000, Mahaney et al.
U.S. Appl. No. 09/745,919, filed Dec. 21, 2000, Bayerl et al.
U.S. Appl. No. 09/745,000, filed Dec. 21, 2000, Bayerl et al.
U.S. Appl. No. 09/747,907, filed Dec. 22, 2000, Barrow.

* cited by examiner

INTEGRATED SERVICES HUB BINARY FILE TRIAL RUN PROCESS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to a method for downloading binary files to a customer premises telecommunications hub, and more particularly to a method of automatically testing a new binary file before designating it as the current binary file for the hub.

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carries ATM over ADSL (asymmetric digital subscriber line) traffic to and from a plurality of integrated service hubs (ISHs), which may be at either residential or business locations.

An ISH is a hardware component that links business or residential user devices such as telephones and computers to the broadband, wide area network through a plurality of user interfaces and at least one network interface. A suitable ISH is described in U.S. Pat. No. 6,272,553 entitled "Multi-Services Communications Device," issued on Aug. 7, 2001, which is incorporated by reference herein in its entirety. The network interface typically is a broadband network interface such as ADSL, T1, or HDSL-2. Examples of user interfaces include telephone interfaces such as plain old telephone system (POTS) ports for connecting telephones, fax machines, modems, and the like to the ISH; computer interfaces such as Ethernet ports for connecting computers and local area networks to the ISH; and video ports such as RCA jacks for connecting video players, recorders, monitors, and the like to the ISH.

In providing telephony services over a broadband network, the ISH communicates with a service manager. This connection between the telephone and the network element is typically an ATM connection, which is much different than the traditional analog line to the local switch. ATM connections usually do not support analog telephony signals, such as off-hook, dial tone, and busy signals. Therefore, the ISH must provide many of the telephony functions traditionally provided by the telephone provider central office such as detecting off-hook conditions, on-hook connections, and digits as well as providing the telephones with dial tone, ring voltage (sometimes referred to as ring current), ringback, and busy signals. The terms off-hook and off-hook condition as used herein are generic terms meaning that a user device (whether telephone, facsimile machine, modem, etc.) connected to a telephone line is attempting to access and use the line.

The ISH includes a processing core or central processing unit, CPU, which controls these functions. It must exchange data with numerous peripheral devices within and external to the ISH itself. As with any CPU, it must have appropriate software, i.e. binary files, in order to perform the many required functions. As the controller for the ISH, it requires configuration files to deal with the various interfaces for the POTS ports, Ethernet ports, etc. However, the necessary configuration and binary files are not known until the ISH is installed in a customer premises, such as a private residence. The selection of appropriate files depends on the particular model of ISH which has been installed and the particular set of services which have been ordered by the customer. It is not practical to expect or require individual customers to know how to configure the ISH after it is physically installed. It would be quite expensive to have a trained service technician visit each residence for initializing the system, i.e. loading the necessary software. There is a need for a method for automatically initializing an ISH when it is installed and powered up for the first time.

Systems have been developed for automatically downloading, through the Internet, appropriate configuration and binary code files upon initial startup of a hub or upon a later reboot event which may be for the purpose of upgrading the binary files to a new release. The binary file may need to be upgraded to provide newly developed functions or services or to simply provide different functions as requested by the customer or to correct errors in the file. In any case, the basic purpose of the process is to replace the then operating software with new software.

It is possible for binary code to operate correctly in a test lab and on most commercial units, but to fail to run on some units. The ISHs are not all identical, e.g. they may have various interface options and various revisions of each option. If new code is downloaded into ISH memory and designated as the currently bootable version, but fails when the system is reset or rebooted, the ISH may not work and it may not be possible to automatically replace it. The system may have to be physically removed and returned to the factory for repair. It would be desirable to have a failsafe method of replacing binary code.

BRIEF SUMMARY OF THE INVENTION

The present invention provides a system and method for downloading binary files which tests new binary files for functionality before locking the new file as the current binary file. A newly downloaded binary file is written into flash memory. The ISH is then restarted with the new file and a verification process is run to be sure the file operates properly. Upon verification of functionality, the new file is designated as the current binary file. If the verification fails, the ISH is restarted with the previous binary file which remains designated as the current file.

In a preferred embodiment, the trial run process includes writing a trial run message into a volatile memory, e.g. an SDRAM, after storing the new binary file in flash memory. Then the system is rebooted. The trial run message survives normal, or soft, rebooting. The boot block software first looks for the trial run message in the volatile memory and, upon finding it, deletes the message and starts the system using the new binary file and runs the verification process. In the event of trial run failure, the system is rebooted. Upon reboot, the boot software will not find a trial run message and will use the old binary file which will still be designated the current binary file in flash memory. In the event of a complete failure or system lock up, the trial run message can be removed by powering down the system which will delete all information in the volatile memory, including the trial run message. Upon reapplication of power the system reboots with the old binary file.

In a preferred form, the verification process uses the ability of the binary file to communicate with a central office server as an indication of successful operation. Receipt of a DHCP server ACK message, or actual downloading of a configuration file may be accepted as proof of successful operation. Successful communication provides the ability to correct errors in a newly downloaded binary file or to replace it if necessary.

DETAILED DESCRIPTION OF THE INVENTION

Figure 1:
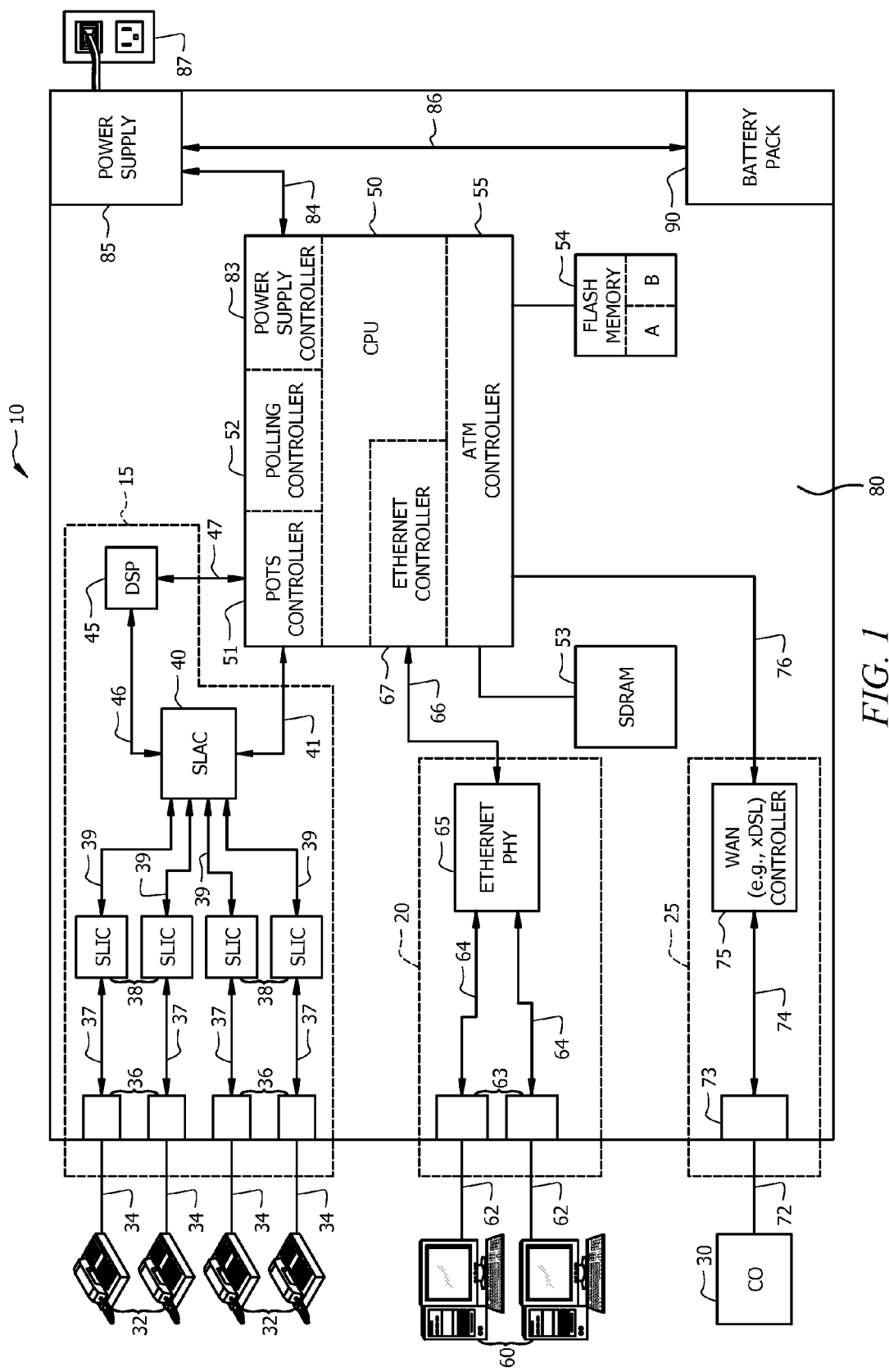
FIG. 1 is a block diagram of an integrated services hub, ISH, according to the present invention.

Referring to FIG. 1, integrated services hub (ISH) 10 comprises plain old telephone system (POTS) interface 15, local area network (LAN) interface 20, and wide area network (WAN) interface 25. POTS interface 15 and LAN interface 20 provide user interfaces for the ISH. WAN interface 25 provides the ISH with an interface to a central office, CO, 30 having a broadband packet network such as Sprint's ION network. The CO 30 provides the wide area connection to the Wide Area Network (WAN), e.g. the ION network and the Internet. In describing the ISH, the components are generally described in carrying out the appropriate function to transmit data from the user interfaces to the WAN, and it should be understood that these components in general perform the reverse function when receiving data from the WAN and transmitting it to the user interfaces.

Telephones 32 are connected by telephone lines 34 to POTS interface 15 by telephone jacks 36, for example industry standard RJ-11 jacks. While four telephones are shown in FIG. 1, any desirable number of telephones may be employed provided that the equipment is appropriately sized to accommodate that number. Telephones 32 are conventional communications devices that typically use the analog telephony format, and similar devices may be substituted such as facsimile machines or modems. Digital format telephones could also be used, with the understanding that the specific circuitry involved would change while providing equivalent functions (for example, detecting hook transitions). Telephone lines 34 are any medium operational to carry telephony signals, and are typically twisted pairs of copper wires.

In addition to telephone jacks 36, POTS interface 15 further comprises subscriber line interface circuits (SLICs) 38, subscriber line access circuit (SLAC) 40, and digital signal processor (DSP) 45. SLICs 38 are connected to telephone jacks 36 by connections 37 on a one-to-one basis. In other words, each telephone connected to the ISH by a telephone jack has a separate and corresponding SLIC. Alternatively, SLICs may incorporate more than one channel each, that is to say a SLIC may be connected to more than one telephone line. The SLICs convert relatively high power, two-line analog signals (also referred to as a tip and ring phone circuit) received from the telephone into relatively low power, four-line analog signals (also referred to as a transmit signal circuit and a receive signal circuit). Furthermore, the SLIC serves as the amplifier that drives power (i.e., voltage and current) onto its corresponding telephone line. Examples of suitable SLICs are integrated circuit chip numbers AM79R79 and AM79R241 produced by Legerity, the former communications division of Advanced Micro Devices (AMD), Inc.

SLAC 40 is connected to SLICs 38 by connections 39. Generally, a SLAC performs three functions: line supervision, signal filtering and manipulation, and analog/digital conversions. The SLAC supervises the lines (and the SLIC corresponding to each line), which includes execution of various protocols for detecting and recognizing an off-hook condition. While a preferred embodiment shown in FIG. 1 uses a SLAC to perform line supervision, SLICs are available that perform line supervision functions, and such enhanced SLICs having integral hook transition monitoring capability could be used. Signal filtering and manipulation is used to conform signals to various industrial or regional/national telephony standards. The SLAC converts four-line analog signals received from the SLICs into four-line digital signals. Thus, the SLAC is an analog to digital (A/D) and digital to analog (D/A) converter, which is also referred to respectively as coding and decoding (i.e., a CODEC). Preferably, the SLAC codes and decodes in compliance with the International Telecommunications Union (ITU) G.711 standard. Typically, a SLAC manages a fixed number of SLICs, and thus the number of SLACs is determined by the number of SLICs. Examples of suitable SLACs are integrated circuit chip numbers AM79Q021 and AM79Q2243 produced by Advanced Micro Devices (AMD), Inc., which are a quad-devices designed to manage four SLICs.

SLAC 40 transmits and receives control data such as line status and signaling to the central processing unit (CPU) 50 by connection 41. The CPU 50 controls the overall function of the ISH and has initialization, management, configuration, and control responsibilities for all of the components and interfaces comprising the ISH. Control software, i.e. the binary code, is stored in flash memory 54. Upon start up or reboot of the ISH, the CPU 50 loads the control software into random access memory, e.g. SDRAM 53, from which it is executed by the CPU 50. Upon execution of the control software, the CPU 50 interacts with various memory mapped peripherals (for example, WAN interface 25). The CPU 50 control software includes a) a POTS control module 51 that controls the telephony functions during operation of the ISH under primary power; b) a polling control module 52 that controls the POTS telephony functions when primary power fails; c) a power supply control module 83 which monitors, either continuously or periodically, the power supply; and d) ATM control module 55 that controls the communications with the network. An example of a suitable CPU is integrated circuit chip number MPC8260 Power QUICC II Communications Processor produced by Motorola, Inc.

Digital signal processor (DSP) 45 compresses (i.e., packetizes) data, typically voice data, received from SLAC 40 by connection 46. DSP 45 transmits compressed data to CPU 50 via connection 47 for transmission to CO 30 by ATM control module 55. An example of a suitable DSP is integrated circuit chip number TMS320VC5402 produced by Texas Instruments, Inc. ATM control module 55 provides the ATM and ML (ATM adaptation layer) layers of the ATM Protocol, which are necessary for ATM-formatted communications with CO 30. In a preferred embodiment, ATM control module 55 is a software module on CPU 50.

Computers 60, for example personal computers located on a residential premises, are connected by connections 62 to LAN interface 20 by LAN connectors 63. LAN connectors 63 are preferably RJ-45 jacks, but any suitable computer connection means may be employed, for example a universal serial bus (USB). While two computers are shown in FIG. 1, any desired number of computers may be employed provided that the equipment is appropriately sized to accommodate that number.

LAN interface 20 further comprises a LAN physical layer (PHY) device 65 connected to LAN connectors 63 by connections 64. LAN PHY device 65 is preferably an Ethernet PHY, and more specifically a MII transceiver. CPU 50 contains an Ethernet control module 67, which serves as a media access control (MAC) device and is connected to LAN PHY device 65 by connection 66. The Ethernet PHY and MAC devices support a 10/100 Mbit industry standard MII Ethernet connection.

The CO 30 is connected by connection 72 to WAN interface 25 by WAN connector 73. WAN connector 73 is preferably a RJ-11 jack for ADSL. WAN interface 25 is preferably a universal, xDSL interface, and more preferably an ATM over ADSL interface. xDSL is a generic term encompassing all known varieties of digital subscriber lines (DSL) such as ADSL, U-ADSL, SDSL, HDSL2, RADSL, etc. Other types of WAN interfaces could be used such as T1, cable modem, wireless broadband modem, or ATM-25.

WAN interface 25 further comprises WAN controller 75 connected to WAN connector 73 by connection 74. WAN controller 75 is connected to ATM control module 55 by connection 76. WAN controller 75 is preferably Globespan's G7000 multimode chip set, which further comprises an analog front end (AFE) chip (Globespan GS707X) and a multimode xDSL downloadable DSP and framer chip (Globespan GS707X). The AFE chip provides analog to digital and digital to analog signal conversions. The DSP and framer chip provides digital signal processing and signal transmission framing functions.

POTS interface 15, LAN interface 20, WAN interface 25, CPU 50, and ATM controller 55 are mounted on motherboard 80, which is a printed circuit board (also referred to as a logic board) that provides the various connections between ISH components as discussed above. The motherboard may include expansion slots to accept expansion cards such as an additional POTS card, an ATM-25 interface, a cable modem, etc. Motherboard 80 is connected to power supply 85 and battery pack 90, thereby providing power to the ISH components, the attached analog telephones, and the battery monitoring and charge circuitry. CPU 50 contains a power supply control module 83 connected to power supply 85 by connection 84. A preferred power supply is a universal-input (40-400 Hz, 90-270V AC RMS) switch mode lead/acid battery float charger with a current-limited output of nominally 13.8 V, and provides charging current to battery pack 90 as represented by connection 86. A preferred battery is a 12 volt DC, 2.5A gel cell (lead-acid) battery, and preferably battery pack 90 comprises two such batteries housed within the ISH.

The power supply is plugged into a standard electrical outlet 87 and serves as the primary power source for the ISH. In the event of a power failure to the electrical outlet, the ISH operates under backup power provided by its battery pack 90 and basic telephone services remain available to the customer for emergency calls.

The controllers illustrated as being part of the CPU 50 are actually software stored as binary code in flash memory 54. Flash memory 54 includes two partitions, labeled A and B in FIG. 1 and also referred to as Flash, A and Flash B, which are reserved for the binary code. At the time of manufacture of the ISH, its final installation location and configuration are not known and therefore the required configuration files and binary code cannot be known. Instead, the ISH is manufactured with a basic binary code stored in Flash A 54 to perform an automatic downloading of configuration files and binary code according to the steps illustrated in FIG. 2. Upon initial startup of the system, that original binary code is read from Flash A 54 into RAM for operation of CPU 50.

Figure 2:
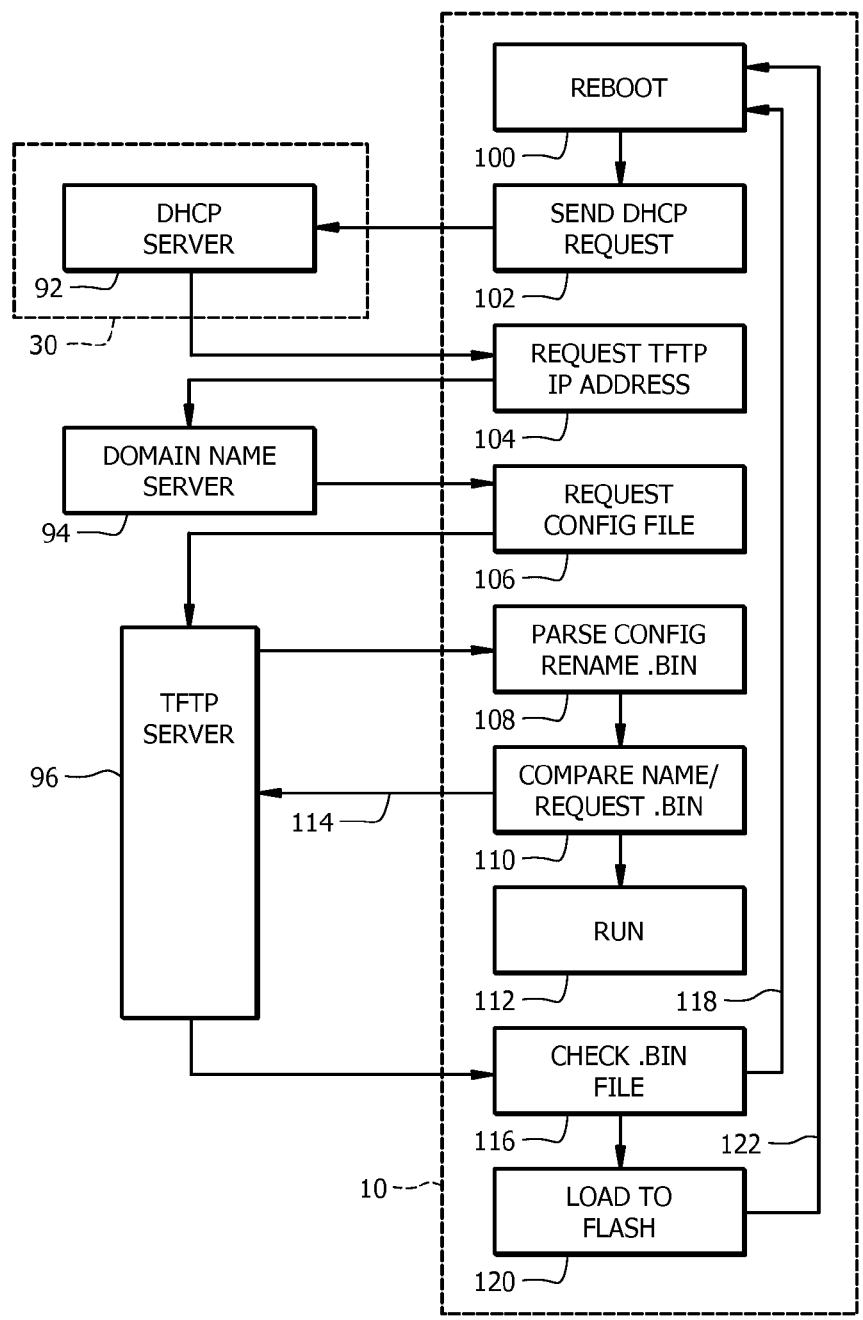
FIG. 2 is a flow diagram illustrating an embodiment of an automatic rebooting process according to the present invention.

In FIG. 2, the dotted line box 10 represents the ISH 10 of FIG. 1, and more particularly the reboot steps which occur in ISH 10. The rebooting process also involves three servers which are external to the ISH and do not need to be located on the same premises as the ISH. One is a DHCP (Dynamic Host Configuration Protocol) server 92, which may be located in CO 30 (FIG. 1). Another is a domain name server, DNS, 94, which may be located essentially anywhere, so long as it is accessible over a network, e.g. the Internet. The third is a TFTP (Trivial File Transfer Protocol) server 96 which may also be located essentially anywhere, so long as it is accessible over a network, e.g. the Internet.

The process described with reference to FIG. 2 occurs on any rebooting event, which term is used herein to include the initial boot up of the system on its original installation and first connection to power source 87. Rebooting of the system also occurs when power has been turned off, e.g. when power at outlet 87 is lost for sufficient time to deplete the backup power supply battery pack 90, and then power is restored. Rebooting also can occur when a manual reset button is pressed or when a reset command is sent over the Internet, e.g. to upgrade the system software to a new release. An alternate manual reset process is to intentionally disconnect the ISH from it power sources and to then reconnect power. As will be described in more detail below, a reboot also occurs as part of the reboot process whenever the process includes successful downloading of a new binary file or when an attempted download fails.

Step 100 in FIG. 2 represents the initiation of all reboot events. In this step the system initializes itself. Initialization includes loading a binary file from flash memory 54 into RAM for operating the CPU 50.

In step 102, the ISH 10 broadcasts a DHCP request to the DHCP server 92 in CO 30. The request includes the MAC ID of the ISH. This request is sent through WAN 25 and over the xDSL lines connecting the ISH 10 to the CO 30. In response to this request, the DHCP server 92 sends back to the ISH 10 an acknowledgment (ACK), a unique IP address to identify the ISH 10, an IP Address of a domain name server (DNS), a TFTP domain name (in this case, the name of TFTP server 94) and a configuration file name, which may be the same as the MAC ID of the ISH. In a preferred embodiment, the response includes IP addresses of multiple DNSs, all of which can provide TFTP server IP addresses. Since the ISH now has its own IP address, it can send data packets to and receive data packets from any other site on the Internet.

In step 104, the ISH uses a DNS IP address which it received from DHCP server 92 to send a request to domain name server 94 to obtain the IP address of the TFTP server 96. In a preferred embodiment where ISH 10 has received multiple DNS IP addresses, the ISH will automatically cycle through the addresses if it does not receive a TFTP IP address within a preselected timeout period or after a preselected number of retries. The DNS server 94 responds by sending to ISH 10 an IP address for the TFTP server 96. In a preferred embodiment, the response from DNS server 94 will include IP addresses for multiple servers associated with the TFTP domain name.

In step 106, the ISH uses a TFTP server IP address which it received from DNS 94 to send a request to TFTP server 96 for the configuration file which was identified by DHCP server 92. In a preferred embodiment where ISH has received multiple TFTP server IP addresses, the ISH will automatically cycle through the addresses if it does not receive a configuration file after a preselected number of retries or within a preselected timeout period. The TFTP server 96 responds by sending the requested configuration file to ISH 10.

In step 108 the ISH 10 receives the configuration file from TFTP server 96 and parses the configuration file. The configuration file contains the name of a binary file. Binary file names consist of three parts. One part, usually a prefix, is a model ID which identifies the model, e.g. C100, of the ISH for which the file is intended. The end of the prefix is identified by the underscore symbol, i.e. "_". The second part is version name which has as the first letter a numeric digit, e.g. 1.23.45.67 or 5version2.0. This second part primarily identifies the release number of the binary files, but each release has different versions intended for different ISH models. The last part of the file name is a-suffix identifying the file type, in this case ".bin" identifying the file as a binary file. Thus a complete binary file name may have the form C100_1.23.45.67.bin. It is important that the binary file be the appropriate one for the model of the ISH which downloads the file. To avoid downloading errors, the ISH renames the binary file. It replaces the model ID part of the binary file name with its own model ID. Thus with reference to the example file name above, if the ISH is a model C50, it deletes the prefix "C100" and replaces it with the prefix "C50". The ISH also checks to be sure that the suffix ".bin" is present at the end of the file name, and, if not, it adds the suffix.

At step 110, after renaming the binary file, the ISH compares the binary file name to the name of the binary file which is stored in the active partition of flash memory 54, either Flash A or Flash B. If the names match, the hub goes into the run state as indicated at 112. In some cases, a reboot may be required at this point because of changes which occurred in the configuration file, even though the correct binary file is in the active flash memory partition.

At step 110, there are several possible reasons why the binary file name may not match the binary file stored in the active flash memory 54 partition. For example, at the time of manufacture, a basic binary file is loaded into Flash A and Flash A is designated the active partition. The basic binary file is not suitable for running the telephony functions of the ISH. It is suited for running the initial reboot process described herein. As a result, on initial start up, the file names will not match. At other times, the file names may not match because the purpose of a reboot was to upgrade to a new release of binary code.

In step 110, if the binary file names do not match, the ISH sends a request, indicated by arrow 114, to the TFTP server 96 for the binary file. The binary file name requested is the name which was generated by the ISH in the renaming process in step 108. As noted above, the ISH 10 has a list of TFTP IP addresses and will retry and cycle through the list if its requests are not answered promptly. It is not necessary to obtain the configuration file and the binary file from the same TFTP server. Multiple servers are normally available for redundancy and quality of service purposes. The TFTP server 96 responds by sending the requested binary file to ISH 10.

At step 116, the ISH 10 receives the requested binary file from TFTP server 96. The file is temporarily stored in its compressed form in SDRAM 53 in processor 50 until certain checks are made. The model ID in the file name is checked to be sure the model ID is correct. This is a double check in conjunction with the renaming process of step 108. If the model ID is correct, the ISH performs a CRC, cyclical redundancy check.

If the file fails to pass either the model check or the CRC check, the ISH goes into error state and, as indicated by arrow 118, goes back to the reboot step 100. The process described herein will then be repeated until a good binary file has been received.

If the file passes both the model and CRC checks, the compressed binary file is moved into the inactive partition of flash memory 54 at step 120. On initial startup, Flash A will be active, and the new file will be moved into Flash B. Once the transfer is completed successfully, the ISH performs a "lock image" on that partition, in this case Flash B. At that point, Flash B becomes the active partition and Flash A becomes the inactive partition of flash memory 54.

When step 120 has been completed, the ISH will send a reboot signal as indicated by arrow 122. This is needed because, at that point in the process, the binary file which is operating the processor 50 is still the file which was stored in the active partition of flash memory 54, e.g. Flash A, when the process started. Upon reboot, the new binary file, e.g. in Flash B, will be loaded into RAM and the system will operate with the new binary file. When the ISH gets to step 110, it should find that the designated binary file name matches the file in the active flash memory 54 partition, e.g. Flash B, and the system will move into the run state 112.

In the above description, an initial startup sequence has been described. In that sequence, the factory loaded binary file was in Flash A and Flash A was the designated active partition. After successful startup, a new binary file was stored in Flash B and Flash B was designated the active partition. When a new binary file, e.g. a new release, is to be downloaded into the ISH, it will be written over Flash A and Flash A will become the active partition again. Successive updates will be written into the then inactive partition, which will become the active partition when the file has been successfully saved to flash memory 54. This process avoids loss of all valid binary files in the event of power loss or other interruption during the process of writing a new binary file to flash memory. That is, any unsuccessful binary file download attempt can be started over with the same binary file as it started with.

The above description assumes that each step of the process works as intended on the first try. The ISH may desirably provide some additional steps when the process does not work smoothly. One is an overall timeout for the startup process. If the ISH does not reach the run state 112 within the set time, the ISH will reset and start the process over. The ISH may retry a given DNS 94 or TFTP server 96 a limited number of times before the system tries another domain name server or TFTP server. If the parsing operation in step 108 fails, the system may also reset and start the process over.

Another mode of failure in a binary file download process has been discovered and is addressed by the present invention. Even if the binary file has the correct model number and passes the CRC test and has been successfully downloaded to flash memory 54, it may not work correctly. The particular ISH may contain various options, or old versions of options, which were not available for testing when the latest version of binary code was developed. In that event, it is possible that the new binary file locked into flash memory will not function properly. The failure may lock up the system or at least prevent it from communicating with the external servers 92, 94 and 96 as it would need to do to obtain a good binary file. If this happens, a technician may be required to visit the installation site and the ISH 10, or at least motherboard 80, will probably have to be removed and returned to the factory for repair.

Figure 3:
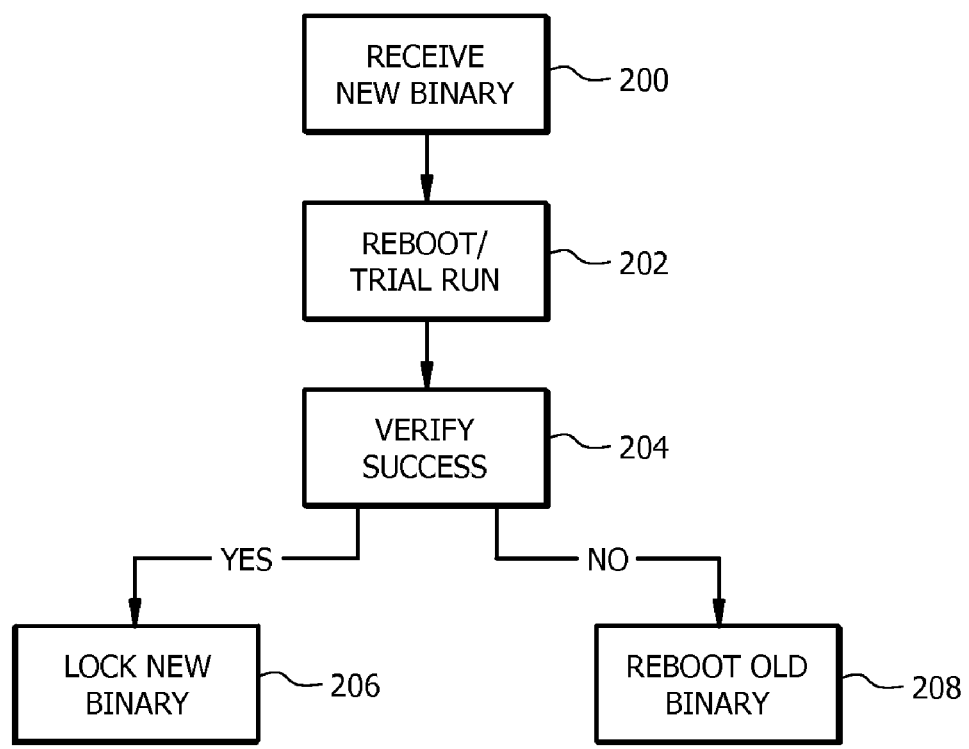
FIG. 3 is a flow diagram illustrating the trial run process of the present invention.

FIG. 3 provides a simple flow chart of a new system for downloading binary files which can avoid this unrecoverable condition. In step 200, a binary file is received and checked by the ISH 10 and stored in Flash memory. Step 200 may correspond to either step 112 or step 116 of FIG. 2. The ISH 10 may be in the run state of step 112 when it receives an unsolicited download of a new binary file. Or the new binary file may be received in the normal course of a reboot process in which a new binary file was requested at step 110 and received at step 116 of FIG. 2. At step 202, before the new file is locked, i.e. designated as the active binary file, the ISH is rebooted with the new file for a trial run. The trial run is performed with the new file, even though it has not been locked or designated as the currently active binary file. At step 204, the successful operation of the new binary file is verified. If the trial run is successful, then at step 206, the new binary file is locked in or designated as the current binary file and the system continues to operate with the new file. If, at step 204, it is determined that the new file does not operate properly, then at step 208 the system is rebooted with the old binary file, which at this time would still be flagged as the currently active binary file.

Figure 4:
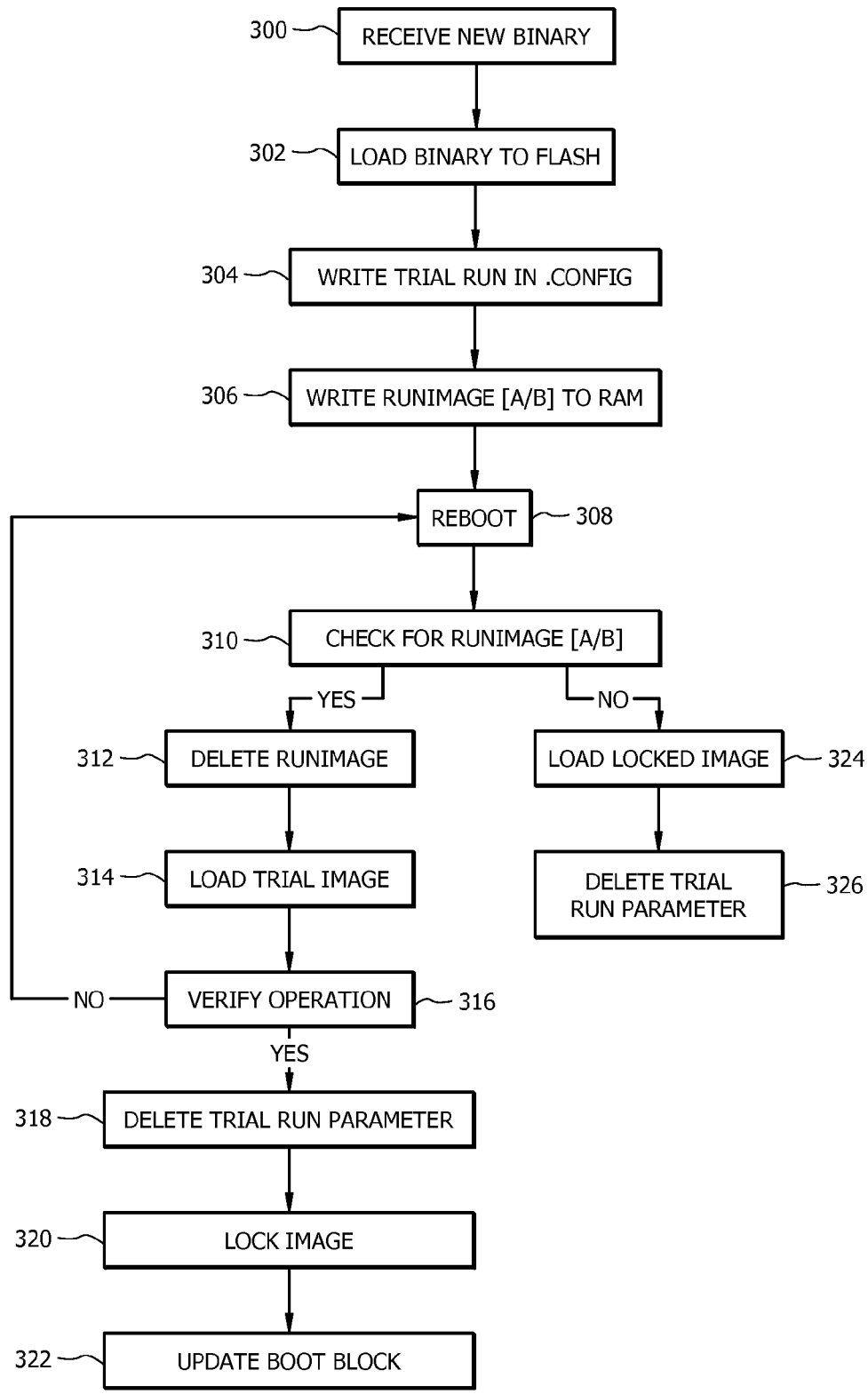
FIG. 4 is a more detailed diagram of a trial run process illustrating a preferred embodiment.

FIG. 4 is a block diagram illustrating more details of a preferred embodiment of the trial run binary file download process. At step 300, a new binary file is received by ISH 10 and passes the preliminary tests as done in step 116 of FIG. 2. As discussed with reference to FIG. 3, the file may be received during normal operations as an unsolicited download or as part of a reboot process. At step 302 the new binary file is loaded into flash memory 54. For this example, we will assume that the ISH 10 is operating with a binary file stored in flash 54 section A, i.e. Flash A. The new binary file is therefore loaded into Flash B, but it is not flagged or locked as the current active section.

At step 304 a trial image parameter is written into the configuration database in flash memory 54. The parameter may have the form "trial_image=<binary file name>". This identifies the fact that a trial run of the new binary file having the identified binary file name is to occur.

At step 306 a trial message is written into a designated or reserved location in SDRAM 53. This message identifies either Flash A or Flash B as the location of a binary file which is to be tested with a trial run. In the preferred embodiment, this message may be of the form RUNIMAGE[A or B]. In the present example where the currently locked image is in Flash A, the message may be RUNIMAGE[B]. At this point, a flag still exists in flash memory 54 indicating that Flash A contains the current active binary file, which is at this point operating the system.

At step 308 a reboot command is issued. Except for the differences described below, the system repeats the process of FIG. 2. At step 310, the boot block software which runs the initialization process at step 100 of FIG. 2 checks the designated location in SDRAM 53 to see if a trial message exists there. In this case, it will find the message RUNIMAGE[B] and know that it is to load the binary file in Flash B and begin operating with it. If the boot block software does not find a trial message in the SDRAM location, it looks to the Flash memory 54 for the flag which identifies which section, A or B, is currently active and loads it into RAM for operating the system.

SDRAM 53 is normally considered to be volatile memory. As a result, it would be expected that the trial run message stored in step 304 would not survive the reboot process. However, we have found that an automatic or soft reboot normally occurs in less than one second and that data stored in SDRAM survives for at least that long without the normal refresh cycle. In the unusual case, where for some reason the trial run message does not survive, it is a failsafe occurrence. The system will simply restart with the "old" binary file which remains flagged in flash memory 54 as the currently active binary file.

If at step 310, the RUNIMAGE[B] message was found in SDRAM 53, then at step 312 the system deletes the RUNIMAGE[B] message from the designated location in SDRAM 53. This avoids an endless loop operation in the event that the trial image fails to operate correctly. At step 314, the system loads the trial image from FLASH B and proceeds with the reboot process of FIG. 2.

Part of the standard reboot process of FIG. 2 is the check of a downloaded configuration file for a binary file name in step 110. In the trial run case, the ISH substitutes the name of the new binary file into the configuration file or otherwise ignores any disagreement of the binary file names.

At step 316, the ISH performs a verification of the proper operation of the new binary file or trial image. This occurs as the system performs the reboot process of FIG. 2. An indicator of successful operation is that the system is able to communicate with external devices such as servers 92, 94 and 96 of FIG. 2. The first indicator of successful operation is therefore the receipt of the ACK from DHCP server 92. The verification process may therefore be considered complete when the ACK message is received or when the system fails to receive an ACK message after completing its normal retry steps. If desired, the verification may include receipt of messages from DNS 94 and TFTP server 96. Receipt of messages from these servers indicates that the system can communicate with external devices sufficiently to obtain new configuration files and binary files as would be needed to correct errors or upgrade the system in the future.

If the verification process of step 316 indicates that the new binary file is functional in the ISH 10, then at step 318 the trial run parameter is deleted from the configuration file in Flash memory 54. At step 320, the new file is locked in flash 54 as the current active binary file, i.e. in this example FLASH B will be flagged as the currently active section. As a result, upon the next reboot, the system will restart with the newly downloaded binary file. Since the new file passed the trial run, no reboot is needed and the system continues to operate with the new binary file.

At step 322, the system checks the new binary file to see if the boot block has changed. If it has, then the system updates the boot block to the new boot block.

If at step 316 the new file fails the verification test, e.g. cannot receive an ACK message from the DHCP server, then the system issues a reboot command, i.e. goes back to step 308, and the process of FIG. 2 is repeated. Since the trial run message, RUNIMAGE[B], has been deleted, the boot block will find the old binary file in Flash A designated as the current binary file. At step 324, the system loads the old binary file into RAM. At step 326, the system deletes the trial run parameter from the configuration file in flash memory 54.

After loading the old binary file at step 324, the system will of course perform the reboot process of FIG. 2. During the reboot process it will likely receive a configuration file from server 96 which indicates that it should be operating with the trial image which just failed the verification test. It will download the trial binary again and perform another trial run which will likely fail. If the new trial runs continue to fail, this cycle continues until the configuration file in TFTP server 96 is updated to point to a binary image that does not fail. As noted above, the server 96 performs system management functions and may be programmed to notify a system manager when repeated reboots and file downloads occur so that remedial action can be taken. Alternatively, the server 96 may automatically update the configuration file to point to alternative binary files which may function properly in the ISH 10. The ISH may also be programmed to send a trial run failure message to server 96 and a system administrator at the time it performs step 326, since that step indicates trial run failure. In any case, the system remains in an operational state which allows remote downloading of new configuration and binary files. A lock up condition which requires a site visit and return of equipment to the factory is avoided.

If for any reason the system failure caused by a faulty new binary file is so complete that the verification process step 316 and steps 324 and 326 cannot function, there is a simple and fail safe method for restarting the system. If power is removed from the system for a short period of time, but more than about one second, the trial run message is SDRAM 53 will be erased. When power is reapplied, the reboot process of FIG. 2 will be performed and the original binary file in Flash A will be designated as the current binary file.

While the present invention has been illustrated and described with reference to particular equipment and methods of operation, it is apparent that various changes and substitution of equivalent parts can be made within the scope of the present invention as defined by the appended claims.

We claim:

1. A computer-implemented method of downloading a binary file to a customer premises telecommunications hub, the method comprising:
   receiving a new binary file in the customer premises telecommunications hub,
   configuring a non-volatile memory using a trial run parameter;
   loading the new binary file into a location of non-volatile memory on the hub; flagging, in the non-volatile memory, an old binary file as a currently active file;
   soft rebooting the hub; and
   checking, during the soft rebooting, whether a trial run message is stored in a volatile memory on the hub; and
   if a trial run message is stored in the volatile memory,
      identifying the location in non-volatile memory of the new binary file based on the trial run message,
      deleting the trial run message,
      operating the hub with the new binary file, and
      verifying proper operation of the hub with the new binary file; else
   if the trial run message is not stored in the volatile memory,
      operating the hub with the old binary file, and
      deleting the trial run parameter.

2. The computer-implemented method of claim 1, further comprising:
   if proper operation of the hub with the new binary file is verified,
   deleting the trial run parameter; and
   flagging, in the non-volatile memory, the new binary file as the currently active file for the hub.

3. The computer-implemented method of claim 1 wherein verifying proper operation of the hub with the new binary file comprises receiving an acknowledgment message from an external server.

4. The computer-implemented method of claim 1 wherein verifying proper operation of the hub with the new binary file comprises receiving a configuration file from an external server.

5. The computer-implemented method of claim 1 wherein:
   proper operation of the binary file is verified by detecting the receipt of a domain name from an external server.

6. A customer premises telecommunications hub comprising:
   a nonvolatile memory having a first and second memory partition;
   means for designating an old binary file in the first memory partition as currently active;
   means for receiving a new binary file;
   means for storing the new binary file into the second memory partition;
   means for configuring the non-volatile memory using a trial run parameter;
   means for soft rebooting the hub;
   means for checking, during soft rebooting, whether a trial run message is stored in a volatile memory on the hub;

means for operating the hub with the new binary file stored in the second memory partition;

means for identifying a partition of non-volatile memory storing the new binary file based on the trial run message; and means for deleting the trial run message.

7. The customer premises telecommunications hub according to claim 6, wherein:

said means for verifying proper operation comprises means for detecting the receipt of a signal by said hub from an external server.

8. The customer premises telecommunications hub according to claim 7, wherein:

said signal is an acknowledge message from a DHCP server.

9. The customer premises telecommunications hub according to claim 7, wherein:

said signal is a configuration file from a TFTP server.

10. In a customer premises telecommunications hub, a method comprising;

storing a new binary file in a location of non-volatile memory; flagging, in the non-volatile memory, an old binary file as a currently active binary file;

storing a trial run message in a volatile memory,
wherein the trial run message identifies the new binary file stored in the location of non-volatile memory;

soft rebooting the hub;
if the trial run message is still stored in the volatile memory,
deleting the trial run message; and
operating the hub with the new binary file, and
verifying proper operation of the hub with the new binary file, and
after verifying proper operation of the new binary file,
flagging, in the non-volatile memory, the new binary file as the currently active binary file, and
deleting the trial run parameter.

11. The computer-implemented method of claim 2, further comprising if proper operation of the hub with the new binary file is not verified,
soft rebooting the hub;
operating the hub with the old binary file; and
deleting the trial run parameter.

12. The customer premises telecommunications hub of claim 6, further comprising:

means for operating the hub with the old binary file stored in the first memory partition; and means for deleting the trial run parameter.

13. In the customer premises telecommunications hub of claim 10, the method further comprising:

soft rebooting the hub; and
if proper operation of the hub is not verified,
operating the hub with the old binary file; and
deleting the trial run parameter.

14. In the customer premises telecommunications hub of claim 10, the method further comprising:

if proper operation of the hub with the new binary file is verified,
flagging, in the non-volatile memory, the new binary file as the currently active binary file; and
deleting the trial run parameter.

* * * * *